(12) United States Patent
Kwon

(10) Patent No.: US 9,609,295 B2
(45) Date of Patent: Mar. 28, 2017

(54) DISPLAY DEVICE AND METHOD FOR ADJUSTMENT OF AN IMAGE

(71) Applicant: Hyundai Motor Company, Seoul (KR)

(72) Inventor: Gideok Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 211 days.

(21) Appl. No.: 14/446,895

(22) Filed: Jul. 30, 2014

(65) Prior Publication Data

US 2015/0181184 A1    Jun. 25, 2015

(30) Foreign Application Priority Data

Dec. 19, 2013  (KR) .................. 10-2013-0159595

(51) Int. Cl.
*G03B 21/14* (2006.01)
*H04N 9/31* (2006.01)
*H04N 5/74* (2006.01)

(52) U.S. Cl.
CPC ............ *H04N 9/3194* (2013.01); *H04N 5/74* (2013.01); *H04N 9/3129* (2013.01)

(58) Field of Classification Search
CPC ............ H04N 5/74; H04N 9/31; G03B 21/14
See application file for complete search history.

(56) References Cited

U.S. PATENT DOCUMENTS

| | | | | |
|---|---|---|---|---|
| 2005/0073845 A1* | 4/2005 | Matsui | ................ | G09G 3/3413 362/293 |
| 2009/0284506 A1* | 11/2009 | Chikaoka | ............. | H04N 9/3155 345/207 |
| 2011/0080534 A1* | 4/2011 | Perng | .................... | G02F 1/1336 349/9 |

FOREIGN PATENT DOCUMENTS

| | | |
|---|---|---|
| EP | 0260758 B1 | 3/1994 |
| JP | 2005-101825 A | 4/2005 |
| JP | 2010-507128 A | 3/2010 |
| JP | 2011-530209 A | 12/2011 |
| KR | 10-2012-0053146 A | 5/2012 |
| KR | 20120099845 A | 9/2012 |
| KR | 20130087519 A | 8/2013 |

* cited by examiner

*Primary Examiner* — Sultan Chowdhury
*Assistant Examiner* — Danell L Owens
(74) *Attorney, Agent, or Firm* — Mintz Levin Cohn Ferris Glovsky and Popeo, P.C.; Peter F. Corless

(57) ABSTRACT

A display device and method are provided. The display device includes a projector that is configured to project light based on an image signal per frame unit on a screen and a light receiving sensor that is configured to output a voltage proportional or inversely proportional to an amount of light reflected by the screen among the light according to the image signal. A controller is configured to measure the amount of light reflected by the screen based on the voltage output from the light receiving sensor, to detect an abnormal position at which the voltage that corresponds to the amount of light reflected by the screen exceeds a predetermined reference voltage, and to adjust an image signal to be projected on the abnormal position in a subsequent frame.

18 Claims, 3 Drawing Sheets

DISPLAY DEVICE AND METHOD FOR ADJUSTMENT OF AN IMAGE

CROSS-REFERENCE TO RELATED APPLICATION

This application claims priority to and the benefit of Korean Patent Application No. 10-2013-0159595 filed in the Korean Intellectual Property Office on Dec. 19, 2013, the entire contents of which are incorporated herein by reference.

BACKGROUND (a) Field of the Invention

The present invention relates to a display device and method. More particularly, the present invention relates to a display device and method that may adjust or control uniformity of an image displayed by the display device using a laser scanning projector.

(b) Description of the Related Art

As the multimedia society progresses, display screen sizes have increased and image quality and resolution of the display screen have also increased. In addition, realization of natural colors has increasingly become more important. A light source, such as a laser which has substantially high color purity, is used to realize natural colors. A laser display system using an optical scanner may be included in a display device that displays image using a laser. A laser display system, such as a laser projector that projects an input image signal on a screen using a laser beam output from a laser light source and displays an image that corresponds to the input image signal, has been used in meeting rooms for presentations, theaters, living rooms, and so on.

A laser display system using an optical scanner may include a laser light source, an optical modulator, an optical system, an optical scanner, an image controller, and so on. The laser light source may include a red laser configured to output red light, a green laser configured to output green light, and a blue laser configured to output blue light. The laser light source is configured to output a laser beam to the optical modulator, and the optical modulator is configured to modulate the laser beam input by an image control signal output from the image controller, and generate and output diffracted light to the optical system. Further, the output diffraction light is processed in the optical system, and then output to the optical scanner. The optical scanner is configured to rotate mirrors disposed in the optical scanner at a predetermined angle to scan the diffracted light based on a control signal from the image controller, display an image that corresponds to the diffracted light.

However, according to a type of rear side projection using the laser display system in the related art, uniformity of displayed image gradually deteriorates from the center of the screen to the side thereof due to the difference of distances and incidence angles between the screen and the laser light source.

The above information disclosed in this section is merely for enhancement of understanding of the background of the invention and therefore it may contain information that does not form the prior art that is already known in this country to a person of ordinary skill in the art.

SUMMARY

The present invention provides a display device and method having advantages of measuring uniformity of an image displayed on a screen in real time to adaptively control or adjust power of a light (or laser) source. The present invention also provides a display device and method having advantages of enhancing uniformity of image brightness. Exemplary embodiments of the present invention are not limited to the aforementioned concept, and other concepts not mentioned above will be apparently understood by a person of ordinary skill in the art to which the present invention belongs, from the following description.

An exemplary embodiment of the present invention provides a display device, that may include: a projector configured to project light according to an image signal per frame unit on a screen; a light receiving sensor configured to output a voltage proportional or inversely proportional to an amount of light reflected by the screen among the light according to the image signal; and a controller configured to measure the amount of light reflected by the screen based on the voltage output from the light receiving sensor, to detect an abnormal position at which the voltage that corresponds to the amount of light reflected by the screen exceeds a predetermined reference voltage, and to adjust an image signal to be projected on an abnormal position in a subsequent frame. Accordingly, it may be possible to adaptively control or adjust power of a light (or laser) source for an image displayed on a screen. In addition, it may be possible to enhance uniformity of image brightness.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
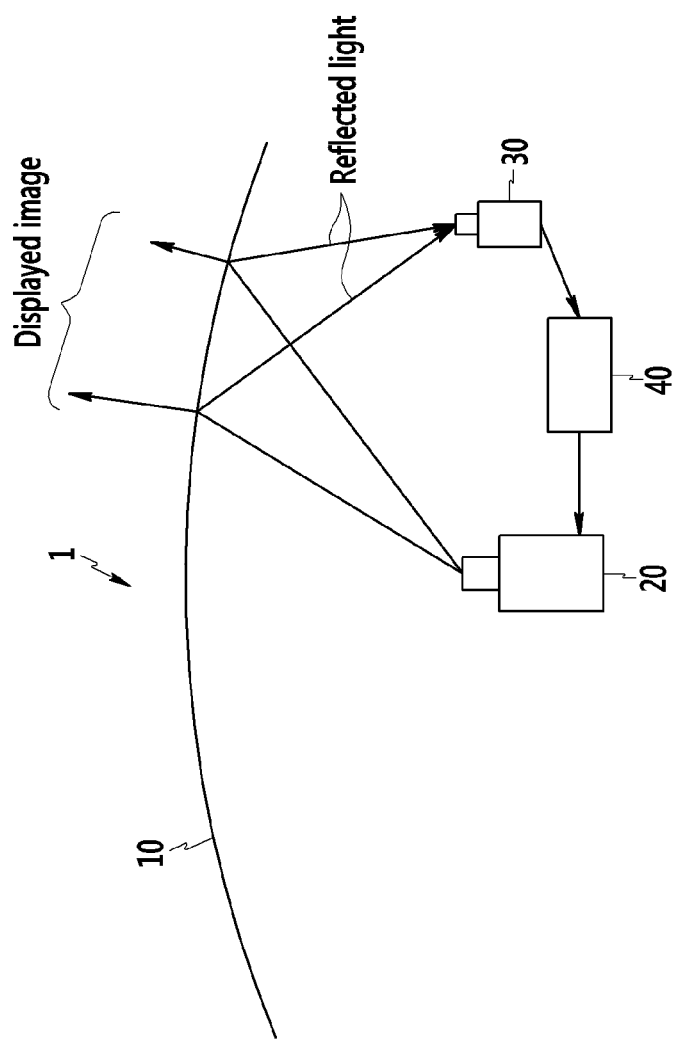
FIG. 1 shows an exemplary schematic diagram of a display device according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification.

Unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Figure 2:
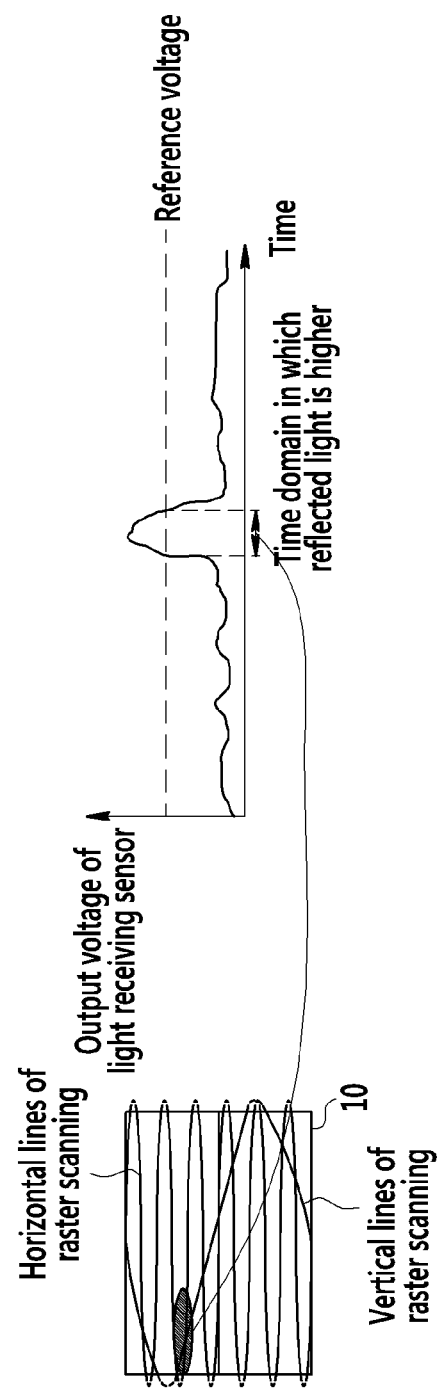
FIG. 2 shows an exemplary schematic diagram for explaining a process in which a controller according to an exemplary embodiment of the present invention detects an abnormal position.

FIG. 1 shows an exemplary schematic diagram of a display device according to an exemplary embodiment of the present invention. FIG. 2 shows an exemplary schematic diagram for explaining a process in which a controller according to an exemplary embodiment of the present invention detects an abnormal position. Hereinafter, referring to FIGS. 1 and 2, a display device according to an exemplary embodiment of the present invention will be described.

A display device 1 according to an exemplary embodiment of the present invention may include a screen 10, a projector 20, a light receiving sensor 30, and a controller 40. An image that corresponds to an image signal projected from the projector 20 may be displayed on the screen 10. The projector 20 may be operated by the controller 40, and may be configured to project light based on the image signal on the screen 10 per frame unit. The projector 20 may include a red-green-blue (RGB) laser light source. The projector 20 may be a laser scanning projector that implements a raster scanning method that projects light according to an image signal in a dot shape.

The RGB laser light source of the projector 20 may include an embedded micro-electro-mechanical Systems (MEMS) mirror(s), and may be configured to project the light according to the image signal on the screen 10 by the raster scanning method. Since the light according to the image signal may be projected by the raster scanning method, time and position for each light dot projected on the screen 10 may be calculated. A portion of light projected from the projector 20 may be transmitted through the screen 10 for the image to be displayed, and may reach a user's eye(s). In addition, the other portion of light from the projector 20 may not be transmitted through the screen 10, and may be reflected light reflected by the screen 10. In other words, a first portion of the light may be transmitted through the screen while a second portion of the light may be reflected.

A ratio of the transmitted light and reflected light at each region (point) of the screen 10 may become different based on a distance from the laser light source at the each region (point) of the screen 10 and an incident angle of light projected on the screen 10. Particularly, since a decreasing ratio of energy of laser light may be substantially small at a near distance, the incident angle of light projected on the screen 10 may become more pertinent. The incident angle of light projected on the screen 10 may be determined based on a position of the each region (point) of the screen 10 with respect to the laser light source and a designed curvature of the screen 10. For example, the incident angle of light projected on the screen 10 may increase as the each region (point) of the screen 10 is positioned further away from the center of the screen 10 and the curvature of the screen 10 is greater.

Accordingly, since the incident angle of light projected on the screen 10 increases at a region (point) which is positioned further apart from the center of the screen 10 and on which the curvature of the screen 10 is greater, an amount of light reflected therefrom increases. That amount of light reflected from the screen may increase as the light intensity of the image inputted in user's eyes decreases. In addition, the controller 40 may be configured to detect a position of an image signal of a current frame on the screen using a voltage output from the light receiving sensor in real time, and adjust the image signal of a subsequent frame.

Referring to FIG. 2, the controller 40 may be configured to measure a position of light projected in a dot shape on the screen 10 using the raster scanning method in the time domain. The controller 40 may be configured to measure the position of the light projected in the dot shape on the screen 10 with respect to the current frame; compare a predetermined reference voltage with a voltage output from the light receiving sensor 30 in the current frame; and detect an abnormal position of the screen at which the output voltage of the light receiving sensor 30 measured in the current frame exceeds the predetermined reference voltage in real time.

Further, the controller 40 may be configured to increase an optical output of an image signal to be projected on the abnormal position in a subsequent frame when the output voltage of the light receiving sensor 30 measured in the current frame is less than the predetermined reference voltage. In addition, the controller 40 may be configured to decrease an optical output of an image signal to be projected on the abnormal position in a subsequent frame when the output voltage of the light receiving sensor 30 measured in the current frame exceeds the predetermined reference voltage. Accordingly, the controller 40 may be configured to adjust optical output of the image signal to more uniformly display the image displayed on the screen 10 on multiple regions of the screen 10.

The light receiving sensor 30 may be configured to measure an amount of light reflected by the screen 10 among light based on the image signal output from the projector 20, and output a voltage proportional or inversely proportional to the measured amount of light reflected by the screen 10. For example, the light receiving sensor 30 may be configured to output a substantially high voltage (e.g., about 3-5 volts) when the measured amount of light reflected by the screen 10 is substantially large (e.g., greater than a predetermined measured amount), and the light receiving sensor 30 may be configured to output a substantially low voltage (e.g., about 0-2 volts) when the measured amount of light reflected by the screen 10 is substantially small (e.g., less than a predetermined measured amount). Additionally, the light receiving sensor 30 may be configured to output a substantially low voltage (e.g., about 1-3 volts) when the measured amount of light reflected by the screen 10 is substantially large (e.g., greater than a predetermined measured amount), and the light receiving sensor 30 may be configured to output a substantially high voltage (e.g., about 3-5 volts) when the measured amount of light reflected by the screen 10 is substantially small (e.g., less than a predetermined measured amount). The light receiving sensor 30 may be synchronized with the projector 20 to measure the amount of light reflected by the screen 10.

Figure 3:
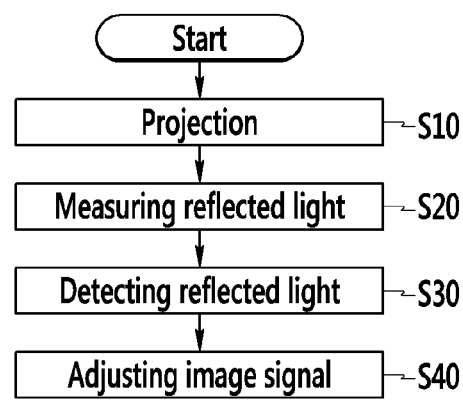
FIG. 3 shows an exemplary flowchart of a display method according to an exemplary embodiment of the present invention.

FIG. 3 shows an exemplary flowchart of a display method according to an exemplary embodiment of the present invention. Hereinafter, referring FIG. 3, a display method according to an exemplary embodiment of the present invention will be described.

In particular, the projector 20 may be configured to project light based on an image signal on the screen 10 per frame unit at step S10. The controller 40 may be configured to measure an amount of light reflected by the screen 10 based on a voltage proportional or inversely proportional to the amount of light reflected by the screen 10 at step S20. The controller 40 may be configured to detect an abnormal position of the screen 10 at which the amount of light reflected by the screen 10 measured in a current frame exceeds a reference amount of light at step S30. The controller 40 may then be configured to adjust an image signal to be projected on the abnormal position in a subsequent frame following the current frame at step S40.

While this invention has been described in connection with what is presently considered to be an exemplary embodiment, it is to be understood that the invention is not limited to the disclosed exemplary embodiment, and those skilled in the art may suggest other exemplary embodiments by adding, modifying, or deleting components within the spirit and scope of the appended claims, and the other exemplary embodiment also falls in the scope of the present invention.

DESCRIPTION OF REFERENCE NUMERALS

10: Screen
20: Projector
30: Light receiving sensor
40: Controller

What is claimed is:

1. A display device, comprising:
    a projector configured to project light based on an image signal per frame unit on a curved screen bent with a curvature;
    a light receiving sensor configured to output a voltage inversely proportional to an amount of light reflected by the curved screen among the light based on the image signal; and
    a controller configured to:
        measure the amount of light reflected by the screen based on the voltage output from the light receiving sensor;
        detect an abnormal position at which the voltage that corresponds to the amount of light reflected by the curved screen exceeds a predetermined reference voltage; and
        adjust an image signal to be projected on the abnormal position in a subsequent frame,
    wherein the light receiving sensor is synchronized with the projector to output the voltage that corresponds to the amount of light reflected by the curved screen,
    wherein the controller increases optical output of the image signal to be projected on the abnormal position when the voltage is less than a predetermined reference voltage and decreases optical output of the image signal to be projected on the abnormal position when the voltage exceeds the predetermined reference voltage.

2. The display device of claim 1, wherein the projector is a raster scanning type of laser scanning projector configured to project the light based on the image signal in a dot shape on the screen.

3. The display device of claim 2, wherein the controller is configured to detect a position of the screen on which the light of the dot shape is projected using a raster scanning method in a time domain, and detect the abnormal position with respect to the time domain in a current frame.

4. The display device of claim 3, wherein the controller is configured to compare a predetermined reference voltage with the voltage that corresponds to the amount of light reflected by the screen in the current frame to detect the abnormal position.

5. The display device of claim 4, wherein the controller is configured to increase optical output of an image signal to be projected on the abnormal position in the subsequent frame when the voltage that corresponds to the amount of light reflected by the screen in the current frame is less than the predetermined reference voltage.

6. The display device of claim 5, wherein the controller is configured to decrease optical output of an image signal to be projected on the abnormal position in the subsequent frame when the voltage that corresponds to the amount of light reflected by the screen in the current frame exceeds the predetermined reference voltage.

7. A display method, comprising:
    projecting, by a projector, light based on an image signal on a curved screen bent with a curvature per frame unit;
    measuring, by a controller, an amount of light reflected by the screen based on a voltage inversely proportional to an amount of the light reflected by the curved screen among the light according to the image signal;
    detecting, by the controller, an abnormal position of the curved screen at which the amount of light reflected by the screen measured in a current frame exceeds a reference amount of light;
    adjusting, by the controller, an image signal to be projected on the abnormal position in a subsequent frame; and
    synchronizing, by the controller, the light receiving sensor with the projector to output the voltage that corresponds to the amount of light reflected by the curved screen,
    wherein the controller increases optical output of the image signal to be projected on the abnormal position when the voltage is less than a predetermined reference voltage and decreases optical output of the image signal to be projected on the abnormal position when the voltage exceeds the predetermined reference voltage.

8. The display method of claim 7, wherein the projector is a raster scanning type of a laser scanning projector configured to project the light according to the image signal in a dot shape on the screen.

9. The display method of claim 8, wherein a position and time that the light according to the image signal is projected in a dot shape on the screen is detected using the raster scanning method in the detection of an abnormal position of the screen.

10. The display method of claim 9, further comprising:
detecting, by the controller, a position of the screen on which the light of the dot shape is projected using a raster scanning method in a time domain; and
detecting, by the controller, the abnormal position with respect to the time domain in a current frame.

11. The display method of claim 10, further comprising:
comparing, by the controller, the predetermined reference voltage with the voltage that corresponds to the amount of light reflected by the screen in the current frame to detect the abnormal position.

12. The display method of claim 11, further comprising:
decreasing, by the controller, an optical output of an image signal to be projected on the abnormal position in the subsequent frame when the voltage that corresponds to the amount of light reflected by the screen in the current frame is less than the predetermined reference voltage.

13. The display method of claim 12, further comprising:
increasing, by the controller, an optical output of an image signal to be projected on the abnormal position in the subsequent frame when the voltage that corresponds to the amount of light reflected by the screen in the current frame exceeds the predetermined reference voltage.

14. A non-transitory computer readable medium containing program instructions executed by a controller, the computer readable medium comprising:
program instructions that control a projector to project light based on an image signal on a curved screen bent with a curvature per frame unit;
program instructions that measure an amount of light reflected by the curved screen based on a voltage inversely proportional to an amount of the light reflected by the curved screen among the light according to the image signal;
program instructions that detect an abnormal position of the curved screen at which the amount of light reflected by the curved screen measured in a current frame exceeds a reference amount of light; program instructions that adjust an image signal to be projected on the abnormal position in a subsequent frame; and
program instructions that synchronize, a light receiving sensor with the projector to output the voltage that corresponds to the amount of light reflected by the curved screen,
wherein the controller increases optical output of the image signal to be projected on the abnormal position when the voltage is less than a predetermined reference voltage and decreases optical output of the image signal to be projected on the abnormal position when the voltage exceeds the predetermined reference voltage.

15. The non-transitory computer readable medium of claim 14, wherein the projector is a raster scanning type of a laser scanning projector configured to project the light according to the image signal in a dot shape on the screen.

16. The non-transitory computer readable medium of claim 15, further comprising:
program instructions that detect a position of the screen on which the light of the dot shape is projected using a raster scanning method in a time domain; and
program instructions that detect the abnormal position with respect to the time domain in a current frame.

17. The non-transitory computer readable medium of claim 16, further comprising:
program instructions that compare the predetermined reference voltage with the voltage that corresponds to the amount of light reflected by the screen in the current frame to detect the abnormal position.

18. The non-transitory computer readable medium of claim 17, further comprising:
program instructions that decrease an optical output of an image signal to be projected on the abnormal position in the subsequent frame when the voltage that corresponds to the amount of light reflected by the screen in the current frame is less than the predetermined reference voltage.

* * * * *